TRANSLATOR CIRCUIT HAVING LINEAR FERROMAGNETIC CORES

Filed Aug. 28, 1963 2 Sheets-Sheet 1

INVENTOR
W. T. WICHMAN
BY Lucian C. Canepa
ATTORNEY

United States Patent Office 3,270,141
Patented August 30, 1966

3,270,141

TRANSLATOR CIRCUIT HAVING LINEAR FERROMAGNETIC CORES

Wesley T. Wichman, Rumson, N.J., assignor to Bell Telephone Laboratories, Incorporated, New York, N.Y., a corporation of New York Filed Aug. 28, 1963, Ser. No. 305,094
12 Claims. (Cl. 179—18)

This invention relates to translator circuits and, more specifically, to an improved magnetic translator embodiment for transferring information from one of a plurality of input switching devices to a plurality of output windings.

Translator circuits are basically arrangements for detecting input information in a first coded form and providing corresponding output information in a second coded form. In applications contemplated by the present invention, the translation relationship is one of code conversion to translate input information represented by an energized one of a plurality of input switching devices, or code points, to output, multidigit binary equivalents. Such code translation circuits, often referred to as "Dimond ring" translators, are useful generally in telephone switching and related fields. Typically, such arrangements comprise a plurality of transformer cores through which each of a plurality of individual input conductors are selectively threaded in accordance with a binary code uniquely identifying each input conductor. Thus, a signal appearing on a selected input conductor produces a resultant magnetic flux change in only those cores through which the conductor is threaded, thereby providing binary output information which identifies the selected input conductor. This type of translator circuit is disclosed, for example, in T. L. Dimond Patents 2,614,176 and 2,657,272, issued October 14, 1952, and October 27, 1953, respectively.

However, as the translator capacity becomes relatively large, i.e., as the number of input conductors increases, the fabrication and testing of the wired core translator assembly becomes increasingly complex. In addition, relatively large diameter cores are required to allow the appropriate number of conductors to pass therethrough, hence necessitating large magnetizing forces, and thereby large input winding currents, to switch appreciable flux in the cores.

It is therefore an object of the present invention to provide an improved translator circuit.

More specifically, an object of the present invention is the provision of a translator circuit which accurately transforms information from one of a plurality of input code points to an equivalent multidigit binary output signal.

It is another object of the present invention to provide a translator which is highly reliable, and which may advantageously be relatively simply and economically constructed.

In accordance with a specific embodiment of this invention, wherein the above and other objects are obtained, the translator comprises two sets of linear ferromagnetic cores with the encoding windings included in a first and second winding plurality being selectively coupled to a different core set in a unique pattern. In addition, a plurality of output windings are each coupled to a different core.

A plurality of normally-open relay contact pairs are provided to connect the first terminals of each of the first plurality of windings to the first terminals of each of the second plurality of windings. Also, a source of potential and ground are respectively connected to the remaining terminals of the first and second winding pluralities. A relay is rendered operative when a corresponding equipment item, whose usage is to be monitored, is seized.

When a pair of contacts is closed, a current flows through one winding associated with each set of cores, and flux is selectively switched therein. Responsive thereto, voltage pulses are induced in a unique pattern of core output windings, hence identifying the energized relay.

It is therefore a feature of the present invention that a translator circuit comprise two sets of ferromagnetic cores, two pluralities of encoding windings each selectively coupled to a different core set, and a relay contact matrix interconnecting the two winding pluralities.

It is another feature of the present invention that a translator circuit advantageously employ only a relatively few encoding windings in comparison with prior art translators with an equivalent encoding capacity.

It is another feature of the present invention that a translator circuit include ferromagnetic cores of a relatively small size in comparison with prior art translators with an equivalent encoding capacity.

A complete understanding of the present invention and of the above and other features, advantages and variations thereof may be gained from a consideration of the following detailed description of an illustrative embodiment thereof presented hereinbelow in conjunction with the accompanying drawing, in which.

An illustrative application in the telephone art in which the present code translation circuit may be employed advantageously is in conjunction with traffic data monitoring apparatus utilized to monitor a plurality of units of telephone equipment, e.g., markers, senders, trunks, etc. A principal type of traffic data accumulated by such monitoring apparatus relates to telephone equipment usage in terms of traffic volumes, or peg counts. Peg count traffic data is obtained by connecting monitoring apparatus to individual control leads emanating from the various units of telephone equipment to be observed. When a unit of equipment assumes a predetermined condition, such as through seizure for use, a signal appears on the individual control lead therefrom. A count of the signals appearing on a control lead during a period of observation indicates the volume of seizures of the particular equipment unit for that period. To eliminate the need for intervening manual or clerical processes, it is desirable to accumulate and record these signals in a form suitable for direct processing and summarization by automatic data processing equipment. However, the signals from the various units of equipment being monitored are electrically indistinguishable and cannot be directly recorded on a storage medium, but rather must be encoded in some manner to identify each signal as to its respective origin. For this purpose, a translator, often called an encoder, is interposed between the monitoring apparatus and the recording apparatus. The translator functions to identify each signal directed thereto from the monitoring apparatus and provides an equivalent binary code notation particularly designating the unit of equipment from which the signal emanated. This equivalent code notation is then recorded for subsequent processing by automatic data processing equipment.

Figure 1:
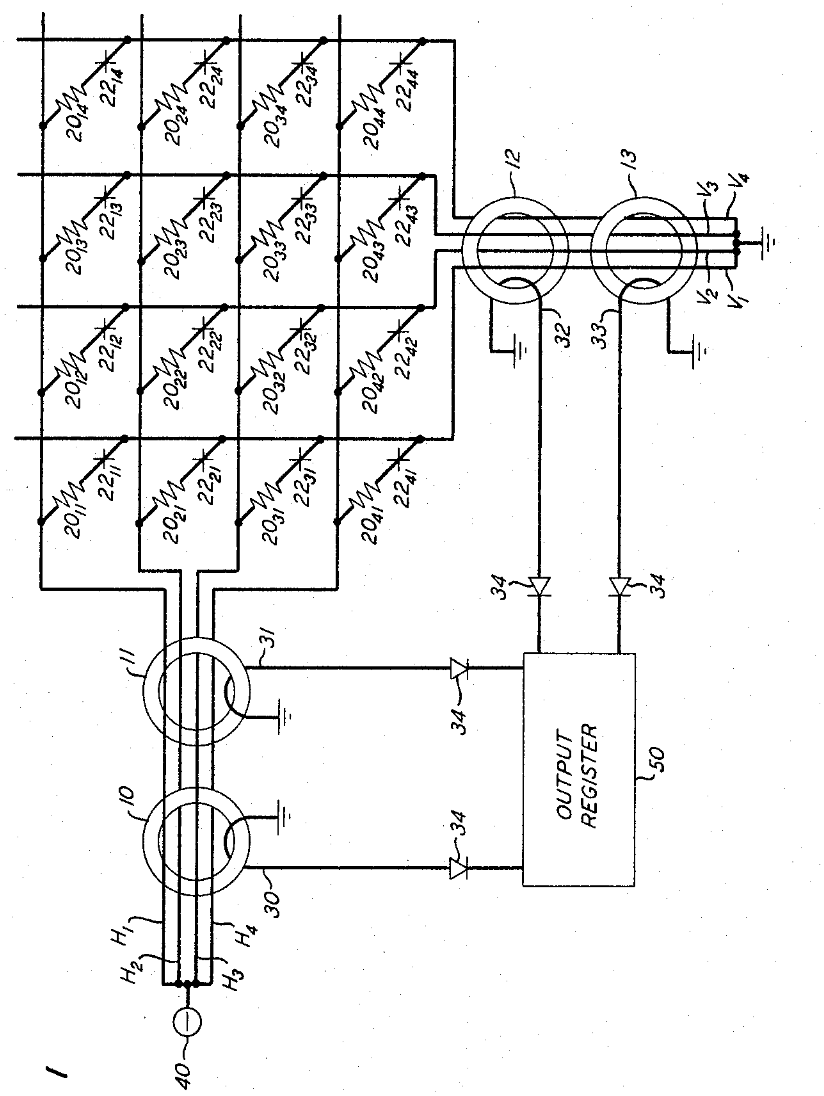
FIG. 1 is a diagram of a specific, illustrative translator arrangement which embodies the principles of the present invention.

Referring now to FIG. 1, there is shown a ring type translator which comprises a first set of linear, ferromagnetic cores 10 and 11, and a second set of similar cores 12 and 13. A first, horizontal plurality of encoding windings $H_1$ through $H_4$ and a second, vertical plurality of encoding windings $V_1$ through $V_4$ are selectively coupled to the first and second core sets, respectively, in a manner which will be set forth in particular detail hereinbelow. A plurality of output windings 30 through 33 are coupled to the cores 10 through 13, respectively, and connected via one of a plurality of rectifying diodes 34 to an output register 50. In addition, a negative voltage source 40 is connected to a first end of each of the horizontal encoding windings $H_1$ through $H_4$. Similarly, a first end of each of the vertical encoding windings $V_1$ through $V_4$ is connected to a common ground terminal.

A matrix array comprising a plurality of networks each including a resistor 20 and a series-connected relay contact pair 22 is provided to connect the second end portion of each of the horizontal encoding windings $H_1$ through $H_4$ to the second end portion of each of the vertical windings $V_1$ through $V_4$. It is noted that the resistors 20 and the contact pairs 22 are further designated with two subscripts which respectively denote the row and column encoding winding to which they are connected. For example, the reference numeral $\mathbf{22}_{34}$ identifies the contact pair associated with the third row horizontal encoding winding $H_3$ and the fourth column winding $V_4$.

The particular manner in which each of the horizontal windings $H_1$ through $H_4$ and each of the vertical windings $V_1$ through $V_4$ is selectively coupled to the corresponding core sets 10 and 11, or 12 and 13, is set forth in Table I hereinbelow:

*Table I*

| Input Winding | Ferromagnetic Core | | | |
|---|---|---|---|---|
| | 10 | 11 | 12 | 13 |
| $H_1$ | 0 | 0 | --- | --- |
| $H_2$ | 1 | 0 | --- | --- |
| $H_3$ | 0 | 1 | --- | --- |
| $H_4$ | 1 | 1 | --- | --- |
| $V_1$ | --- | --- | 0 | 0 |
| $V_2$ | --- | --- | 0 | 1 |
| $V_3$ | --- | --- | 1 | 0 |
| $V_4$ | --- | --- | 1 | 1 |

Where a conductor is coupled to a core, a "1" appears at the corresponding location on Table I, while a "0" indicates that the winding is not magnetically linked to the respective linear core. A dash indicates that the winding and core are not associated, as for example a horizontal winding $H_1$ through $H_4$ and one of the second set of cores 12 or 13.

It is noted that the primary relay windings which, when energized, activate an associated one of the contact pairs 22 may be controlled, for example, by a particular piece of telephone equipment whose usage is to be measured, as discussed hereinabove with respect to traffic data monitoring. The primary relay windings are not shown in FIG. 1 to simplify the drawing. When the corresponding equipment item is seized for use, a current flows through the relay winding thereby closing the associated contact pair.

With the above organization in mind, an illustrative sequence of circuit operation for the FIG. 1 translator arrangement will now be described. Prior to the time *a* shown in FIG. 2, the FIG. 1 translator is in its initial quiescent state with no current flowing through any of the encoding windings $H_1$ through $H_4$ or $V_1$ through $V_4$. Assume at the time *a* shown in FIG. 2, that the contact pair $\mathbf{22}_{23}$ is closed responsive to a current flowing through the primary relay winding associated therewith. This relay energizaiton is represented in the next-to-the-bottom curve in FIG. 2.

With the closing of the contact pair $\mathbf{22}_{23}$, a circuit is completed between ground and the negative source 40 via the vertical conductor $V_3$, the contact pair $\mathbf{22}_{23}$, the resistor $\mathbf{20}_{23}$ and the horizontal winding $H_2$. Hence, responsive to the closing of relay contact pair $\mathbf{22}_{23}$, a current equal in magnitude to the quotient of the voltage supplied by the source 40 divided by the resistance of element $\mathbf{20}_{23}$ flows in the above-identified complete series path. The circuit elements are so chosen that this winding current is sufficient in amplitude to switch an appreciable magnetic flux in any of the cores 10 through 13 which are coupled to an energized winding. In the particular example chosen, the energized conductors $H_2$ and $V_3$ are linked to the cores 10 and 13, but not to the cores 11 and 12 as indicated in Table I supra in FIG. 1. Thus, flux is switched in the cores 10 and 13 only, and output voltages are thereby generated in the output windings 30 and 33 and not in the windings 31 and 32. This set of encoded output voltages occurring in the windings 30 through 33 is illustrated in the four upper graphs included in FIG. 2 for the interval immediately following time *a*. These positive output pulses induced in the windings 30 and 33 are transmitted via the appropriate series connected diodes 34 to the output register 50.

Figure 2:
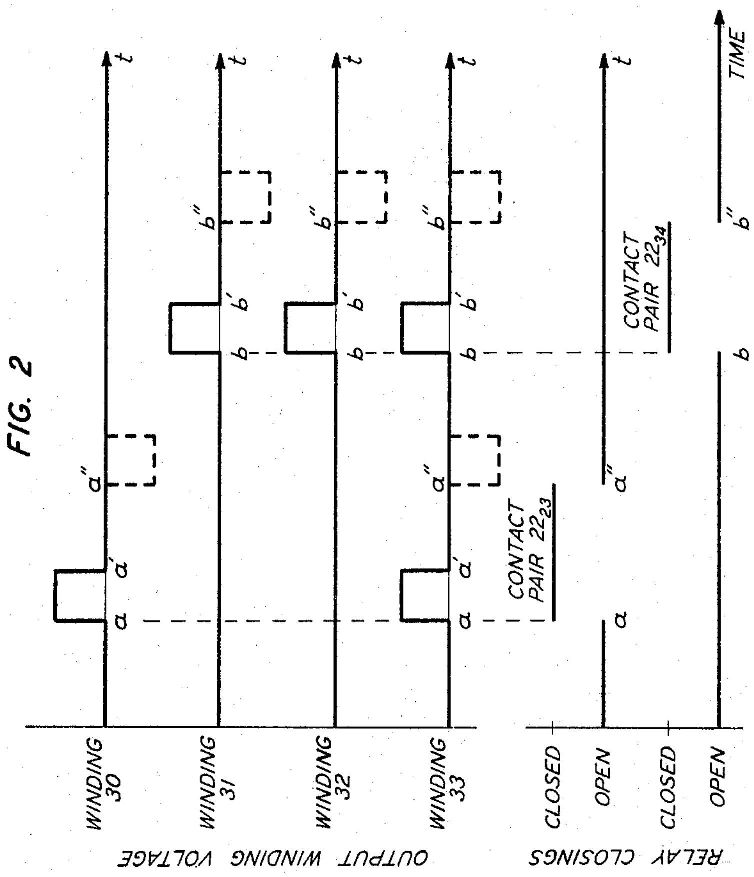
FIG. 2 is a timing diagram illustrating voltage wave shapes and contact closures for selected circuit elements included in FIG. 1.

The pulses persist in the energized output windings 30 and 33 until the time *a'* shown in FIG. 2 when a steady state condition is reached, in which condition the current flowing in the windings $V_3$ and $H_2$ is no longer switching any flux in the cores 13 and 10 coupled thereto.

At the time *a''* shown in FIG. 2, assume that the primary relay winding associated with the contact pair $\mathbf{22}_{23}$ is no longer supplied with a current, and hence the contact pair separates. Under these conditions, there is no longer a complete direct current series path between the source 40 and ground, and the current previously flowing in the windings $H_2$ and $V_3$ terminates. In response thereto, the magnetic condition of the linear cores 10 and 13 is reset to its initial condition with no complete line of flux flowing therethrough, thereby inducing negative voltage pulses in the output windings 30 and 33 coupled to these cores. These output pulses are shown dotted in the relevant curves in FIG. 2 for the time following *a''*. However, the rectifying diodes 34 connected to the windings 30 and 33 prevent the negative signals included therein from being supplied to the output register 50. Hence, following the time *a''*, the circuit is reset to its original state, and is in the proper condition to sense the closing of a new relay contact pair 22, and provide coded output information responsive thereto.

As a further example of circuit functioning, assume now, as shown in the bottommost curve illustrated in FIG. 2, that the contact pair $\mathbf{22}_{34}$ is activated at time *b*, hence establishing a current which flows from ground through the vertical encoding winding $V_4$, the contact pair $\mathbf{22}_{34}$, the resistor $\mathbf{20}_{34}$, and the horizontal winding $H_3$ to the source 40. As the windings $V_4$ and $H_3$ are respectively coupled to the cores 12 and 13, and 11, as indicated in Table I and shown in FIG. 1, the current flowing therethrough switches flux in the cores 11, 12 and 13, but not in the core 10. In response to the change in the magnetic state of the above-identified cores, positive output pulses are induced in the output windings 31, 32 and 33, and transmitted via the appropriate rectifying diodes 34 to the register 50. This set of encoded output pulses is illustrated in the upper four graphs in FIG. 2 for the interval following time *b*. At the time *b'* shown in FIG. 2, the circuit is in its steady state, and the voltage pulses in the output windings 31 through 33 have terminated, as described hereinabove with respect to circuit operation at time *a'*.

At time *b''*, assume that the equipment item associated with the relay contact pair $\mathbf{22}_{34}$ is no longer in use, and that the contact pair $22_{34}$ becomes open-circuited. In response thereto, the current flow through the windings $V_4$ and $H_3$ terminates, and the cores 11 through 13 are reset, thereby inducing negative pulses, shown dotted in FIG. 2, in the output windings 31 through 33. However, because of the diodes 34 associated therewith, the negative pulses are not transmitted to the output register 50. Following the time *b''* shown in FIG. 2, the circuit is once again in the proper condition to encode the occurrence of a new relay closing. Hence, generalizing from the above two examples of translator operation, the circuit has been shown to generate a unique pattern of output signals in the output windings 30 through 33 when each different relay contact pair 22 is activated.

Figure 3:
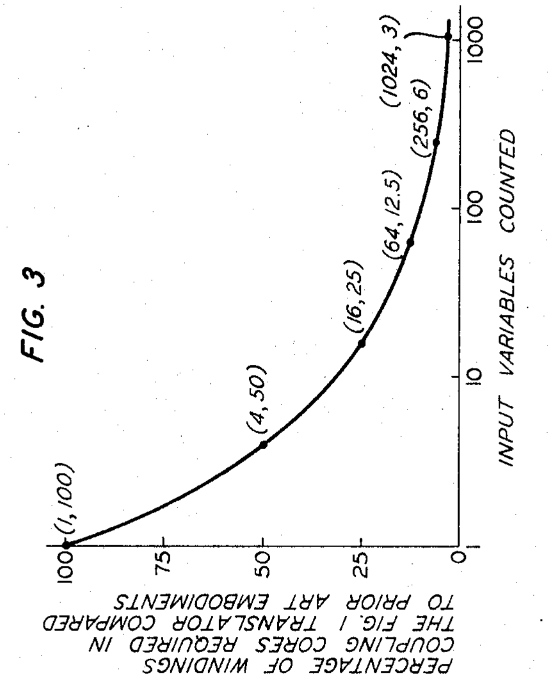
FIG. 3 is a graph comparing the number of input windings employed in the FIG. 1 arrangement with the number of windings required in prior art ring translators.

Several advantages of the FIG. 1 arrangement over prior art translators should be noted at this point. First, by employing the relay matrix between the two sets of encoding windings, a great savings in the number of such windings is effected. In general, the ring translators of the type shown in the aforementioned Dimond patents as well as other, similar arrangements require one encoding winding for each input variable, or peg count employed. Thus, for $2^n$ input variables, $2^n$ input windings must be employed, with each of the cores having $2^{n-1}$ encoding windings coupled thereto. However, in the arrangement shown in FIG. 1, only $2^{n/2}$ encoding windings are required for $2^n$ input variables with $2^{(n/2)-1}$ windings being coupled to each core. The comparison between the winding usage in the instant arrangement and prior art embodiments is shown in FIG. 3, which illustrates the percentage of encoding windings employed in the FIG. 1 translator arrangement, as compared to prior art embodiments, for various translator capacities. Thus, for example, in a 1024 input capacity translator, the savings in the number of encoding windings required, along with the reduction in the associated cost of fabrication and testing, amounts to approximately 97%. Also, as the maximum number of windings coupled to any single core decreases in the same proportion as the total number of windings, the inside diameters of the cores included in illustrative embodiments of the principles of the present invention may be greatly reduced thereby also reducing the size of the magnetizing force required to switch flux in these cores. This renders the FIG. 1 type arrangement more efficient than prior art structures by requiring lower encoding currents.

It is noted that the above savings are not effected at the expense of increasing the number of any other circuit component employed, as the number of cores, resistors and contact pairs are the same in both the FIG. 1 and other translator embodiments.

Summarizing, an illustrative translator circuit arrangement made in accordance with the principles of the present invention comprises two sets of linear ferromagnetic cores with the encoding windings included in a first and second winding plurality being selectively coupled to a different core set in a unique pattern. In addition, a plurality of output windings are each coupled to a different core.

A plurality of normally-open relay contact pairs are provided to connect the first terminals of each of the first plurality of windings to each of the second plurality of windings. Also, a source of potential and ground are respectively connected to the remaining terminals of the first and second winding pluralities. A relay is rendered operative when a corresponding equipment item, whose usage is to be monitored, is seized.

When a pair of contacts is closed, a current flows through one winding associated with each set of cores, and flux is selectively switched therein. Responsive thereto, voltage pulses are induced in a unique pattern of core output windings, hence identifying the energized relay.

It is to be understood that the above-described arrangement is only illustrative of the application of the principles of the present invention. Numerous other embodiments may be devised by those skilled in the art without departing from the spirit and scope of this invention. For example, while a sixteen input capacity translator was illustrated for the purposes of clarity, any number of input variables might well have been employed.

Also, note that linear cores are not required in the FIG. 1 arrangement, and that the cores 10 through 13 in FIG. 1 might well be made of square loop ferromagnetic material. However, in such an arrangement, an additional, resetting winding must be coupled to each of these cores. Also, any switching means, for example a transistor, might well be employed in place of each relay contact pair 22.

In addition, the diodes 34 were employed in the FIG. 1 translator to inhibit the transmission of negative output pulses to the register 50. These diodes may be eliminated if a register is employed which is responsive only to unipolar, positive pulses. Such a register may comprise, for example, a plurality of biased, square loop, ferromagnetic storage elements.

Further, a plurality of "speed up" capacitors may each be connected in parallel with a different resistor 20 in the FIG. 1 arrangement. This would increase the magnitude of the leading edge of the current which flows through the selection windings when a corresponding contact pair 22 is activated.

What is claimed is:

1. In combination, a first and second set of ferromagnetic cores, a first and second plurality of windings, each winding including a first and second terminal, each of said first plurality of windings and each of said second plurality of windings being selectively coupled to cores included in said first and second sets, respectively, an energy source connected to said first terminal of each of said first plurality of windings, a common ground terminal connected to said second terminal of said second plurality of windings, and a plurality of switching means connecting said second terminal of each of said first plurality of windings to said first terminal of each of said second plurality of windings.

2. In combination, a first and second set of ferromagnetic cores, a first and second plurality of windings each selectively coupled to a different core set, each winding included in each of said winding pluralities being coupled to the associated core set in a unique pattern, and a plurality of switching means interconnecting said first and second plurality of windings.

3. A combination as in claim 2, further comprising a plurality of output windings each coupled to a different core included in said first and second core sets.

4. A combination as in claim 3, further comprising an output register, and a plurality of diodes each connecting a different one of said output windings to said output register.

5. A combination as in claim 4, wherein each of said switching means comprises a relay contact pair.

6. In combination, a first and second set of ferromagnetic cores, a first and second plurality of windings each winding including a first and second terminal, each of said first plurality of windings and each of said second plurality of windings being selectively coupled to cores included in said first and second core sets, respectively, and a plurality of switching means connecting said second terminal of each of said first plurality of windings to said first terminal of each of said second plurality of windings.

7. A combination as in claim 6, further comprising an energy source connected to said first terminal of each of said first plurality of windings and a common ground terminal connected to said second terminal of each of said second plurality of windings.

8. A combination as in claim 7, further comprising a plurality of output windings each coupled to a different core included in said first and second core sets.

9. A combination as in claim 8, further comprising an output register connected to each of said output windings.

10. A combination as in claim 6, wherein each of said first and second set of ferromagnetic cores comprises a linear magnetic material.

11. A combination as in claim 6, wherein each of said switching means comprises a relay contact pair.

12. In combination, a first and second digital encoder each including a plurality of encoding conductors, and switching means for connecting each of said conductors associated with said first encoder to each of said conductors associated with said second encoder.

References Cited by the Examiner

UNITED STATES PATENTS

| | | | |
|---|---|---|---|
| 2,834,836 | 5/1958 | Hartley | 179—18 |
| 3,153,228 | 10/1964 | Winkler | 340—347 |

KATHLEEN H. CLAFFY, *Primary Examiner.*

L. A. WRIGHT, *Assistant Examiner.*